United States Patent [19]

Burgbacher

[11] 4,205,708
[45] Jun. 3, 1980

[54] LUBRICATING SYSTEM AND METHOD FOR A TEXTILE MACHINE

[75] Inventor: Herbert Burgbacher, Hilzingen, Fed. Rep. of Germany

[73] Assignee: Sulzer Brothers Limited, Winterthur, Switzerland

[21] Appl. No.: 892,910

[22] Filed: Apr. 3, 1978

[30] Foreign Application Priority Data

Apr. 14, 1977 [CH] Switzerland ............... 4615/77

[51] Int. Cl.² ............................................. D03J 1/00
[52] U.S. Cl. ................................. 139/1 R; 139/45; 139/438; 66/8; 184/6.26
[58] Field of Search .............. 139/1 R, 1 C, 45, 438; 184/6.26, 7, 12, 6; 57/120; 66/8

[56] References Cited

U.S. PATENT DOCUMENTS

| | | | |
|---|---|---|---|
| 3,018,605 | 1/1962 | Shernil et al. | 184/7 A X |
| 3,221,775 | 12/1965 | Boley et al. | 139/45 |
| 3,491,801 | 1/1970 | Lippuner | 139/1 C |
| 3,587,251 | 6/1971 | Vincoli | 184/6.26 X |
| 3,877,547 | 4/1975 | Willuweit et al. | 184/6.26 |
| 3,939,944 | 2/1976 | Mitchell et al. | 184/6.26 |
| 3,941,210 | 3/1976 | Saretzky | 184/6.26 X |
| 4,002,379 | 1/1977 | Martin | 184/6.26 X |
| 4,003,409 | 1/1977 | Steffens | 139/1 R |
| 4,117,869 | 10/1978 | Rushman | 139/1 R |

FOREIGN PATENT DOCUMENTS

| | | | |
|---|---|---|---|
| 2004770 | 8/1971 | Fed. Rep. of Germany | 184/6.26 |
| 1407595 | 9/1976 | United Kingdom | 184/6.26 |

*Primary Examiner*—David H. Brown
*Attorney, Agent, or Firm*—Kenyon & Kenyon

[57] ABSTRACT

The lubricating system generates and delivers a programed sequence of gas (compressed air) pulses and lubricant-mist pulses to the lubricating stations of the textile machine. The pulses are determined by an electronic controller which selectively activates valves in the gas line and the lubricant-mist line. An extractor line is also positioned at each lubricating station for extracting lubricant-mist and dirt therefrom.

22 Claims, 4 Drawing Figures

LUBRICATING SYSTEM AND METHOD FOR A TEXTILE MACHINE

This invention relates to a system and method of lubricating a textile machine. More particularly, this invention relates to a system and method of lubricating various lubricating stations of a textile machine in an automatic manner.

As is known, various types of techniques have been employed for lubricating textile machines such as weaving machines. In one known device, oil mist is taken continuously from an oil mister and supplied to one or more lubricating stations of a machine. However, such a device can only provide a relatively small lubricating effect since textile machinery usually require small lubricating effects in order to avoid soiling of the textiles, for example cloth, being produced. In this regard, if an oil mist is supplied through supply nozzles at the lubricating stations, droplets of oil may form during operation at these nozzles and may soil the textiles being produced.

It is also known, for example from U.S. Pat. No. 4,003,409, to use an oil spray pump to draw oil from a tank via controlled air pulses with the resulting oil—air pulses being delivered to lubricating stations. It is also known from German utility model No. 6604337 to supply droplets of oil into a continuous air stream to produce lubricating pulses therein containing oil and air. However, such systems cannot provide short air pulses of limited duration between the lubricating mist pulses for cleaning excess lubricant from the lubricating stations.

Accordingly, it is an object of this invention to provide a relatively simple system for lubricating the lubricating stations of a textile machine.

It is another object of the invention to provide lubrication to a lubricating station of a textile machine without soiling the textile being produced.

It is another object of the invention to avoid soiling of the textiles produced on a textile machine by a lubricant used for lubricating the machine.

Briefly, the invention provides a method and system for lubricating a textile machine having at least one lubricating station.

In accordance with the method of the invention a programmed sequence of lubricant-mist pulses and gas pulses are delivered to at least one lubricating station of the textile machine. In this regard, the various pulses may be delivered through a common nozzle at the lubricating station and may be delivered in various manners. In one case, the lubricant-mist pulse may be delivered for a longer duration than the gas pulse. In another case, the gas pulse may be delivered immediately after or before delivery of the lubricant-mist pulse. Also, the pulses may be delivered with a time delay therebetween or consecutive sequences of lubricant-mist pulses and gas pulses can be delivered with a time delay therebetween. Also, the lubricant-mist pulse may be at a lower pressure than the gas pulse.

In addition, the method includes a step of generating a programmed sequence of extraction pulses at the lubricating station in order to remove lubricant mist and dirt from the station. These extraction pulses may occur during a lubricant-mist pulse or during a gas pulse. The extraction pulses may also last as long as a corresponding lubricant-mist pulse or as long as a gas pulse. Still further, the extraction pulses may be conveyed through a common nozzle with the lubricant-mist pulses and the gas pulses or through a separate suction passage at the lubricating station.

The lubricating system is comprised of a first means for supplying a gas to the lubricating station, a second means for supplying lubricant-mist to the lubricating station and means, such as an electronic controller, which is connected to each supply means for selectively activating the respective supply means to deliver a programmed sequence of gas pulses and lubricant-mist pulses to the lubricating station. In addition, the system may employ an extractor line at the lubricating station for extracting lubricant-mist therefrom.

The means for supplying the gas includes a tank containing compressed air, a line which communicates the tank with the lubricating station and a valve in the line to control the flow of air. Likewise, the means for supplying the lubricant-mist includes a line connected in parallel with the line from the tank, an oil mister connected to this line to deliver oil mist thereto and a valve in the line upstream of the oil mister to control the flow of air therethrough. The electronic controller is connected to both valves in order to selectively open and close each valve at periodic intervals and in programmed sequence to each other. In this way, pulses of gas or pulses of lubricant-mist can be alternately fed to the lubricating station.

The lubrication provided by the system and in accordance with the method is very reliable and uniform. Further, as is often required for textiles, the supply of lubricant, e.g. oil, is of reduced quantity. The gas or scavenging pulses which, for example are air pulses, obviate any condensation droplets of lubricant. Even after relatively long interruptions in lubrication, it is generally impossible for one or more oil droplets to reach the lubricating station, for instance, upon the resumption of lubrication. This is because the air pulses eject any residual oil mist in the feed line of a lubricating station before any condensation occurs. Further, the feed lines, spray nozzles and lubricating stations are cleaned continuously by the cleaning air pulses and freed from surplus oil mist which might condense during interruptions and lubrication.

Further, the scavenging pulses continually move any fluff or abraded metal from parts of the machinery, or the like, as may in operation settle near the lubricating station. Thus, soil of this nature is prevented from reaching the textile product, e.g. cloth, produced by the machine.

Still further, the system requires only a low oil consumption for lubrication. As a result, there are cost advantages as well as a reduced environmental impact.

The invention allows the use of short air pulses of limited duration which may even be shorter than the lubricating-mist pulses and which may be at higher pressure than the lubricating-mist pulses. Short high pressure pulses of air provide very effective cleaning of the associated lubricating stations, lubricating lines and nozzles. Thus, any dust arising from the machine can be removed. Further, the compressed air consumption can be considerably reduced, particularly if relatively long pauses, i.e. pulse-free periods, are left between discrete pulses.

These and other objects and advantages of the invention will become more apparent from the following detailed description taken in conjunction with the drawings wherein.

Figure 1:
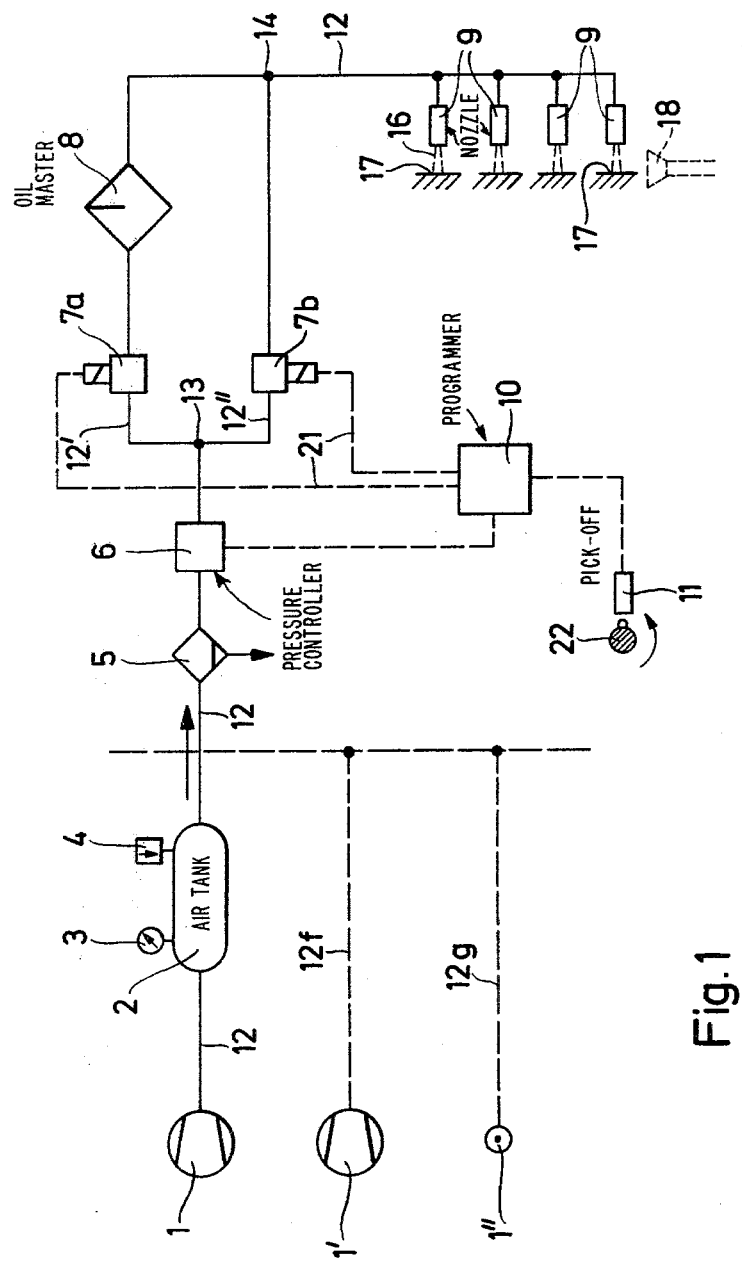
FIG. 1 illustrates a circuit diagram of a lubricating system according to the invention.

Referring to FIG. 1, the lubricating system for a textile machine, such as a weaving machine, is used to supply lubricant to a plurality of lubricating stations, e.g. four which are connected in parallel in a picking mechanism. The system has a first means for supplying a gas such as air to each station 17 in the form of an air pulse as well as a second means for supplying lubricant mist to each station 17 in the form of an air-mist pulse.

The first supply means includes a compressor 1 which operates to compress air for storage in an air tank 2. The air is delivered via a feed line 12 from the compressor 1 to the air tank 2 and remains in the air tank 2 at a constant pressure. In order to adjust the pressure in the tank 2, a safety valve 4 is provided along with a pressure gage 3 as indicated. The air feed line 12 also extends beyond the tank 2 to connect via a water separator 5 for removing water from the air flow and a pressure controller 6 to a branch point 13. A branch line 12″ extends from the branch point 13 to a downstream branch point 14 from which the feed line 12 continues as a single line to feed a plurality of parallel connected lubricating nozzles 9 at the discrete lubricating stations 17. A valve, such as a solenoid valve 7b is disposed in the branch line 12″ to control the flow of air therethrough.

The second supply means employs a second branch line 12′ connected in parallel with the air branch line 12 between the branch points 13, 14. An oil mister 8 is connected to the branch line 12′ to deliver oil mist thereto, and a valve, such as a solenoid valve 7a, in the branch line 12′ upstream of the oil mister 8 is used to control the flow of air through the branch lines 12′.

A means is connected to each of the valves 7a, 7b for selectively opening and closing the valves in a programmed sequence in order to deliver a programmed sequence of air pulses and lubricant-mist pulses to the lubricating station 17. As shown, this means is in the form of an electronic controller or programmer 10 which is connected via control lines 21 to the solenoid valves 7a, 7b. The electronic controller 10 is synchronized with the operation of the weaving machine (not shown) and, particularly, to the main shaft 22 of the machine by means of a speed dependent pick-off 11 in suitable manner.

In addition, the lubricating system employs an oil mist extractor line 18 in at least one of the lubricating stations 17 in order to extract lubricant mist and dirt therefrom. This extractor line 18 can be programmed in a similar manner to the valves 7a, 7b.

In operation, the program in the controller 10 acts by way of the valve 7a to produce a relatively long oil mist pulse 23 (FIG. 2) at a pressure of approximately 0.1 atmosphere gauge (atg). This pulse is immediately followed by a much shorter scavenging air pulse 24 at a higher pressure of 0.5 atg. The oil mist pulse is followed by a scavenging air pulse for example, at approximately every 250 picks of the weaving machine.

The oil mist and air pulses occur at all the parallel lubricating stations 17 as shown in FIG. 1. In this regard, an oil mist 16 issues from the nozzles 9 at each lubricating station 17 requiring lubrication.

Figure 3:
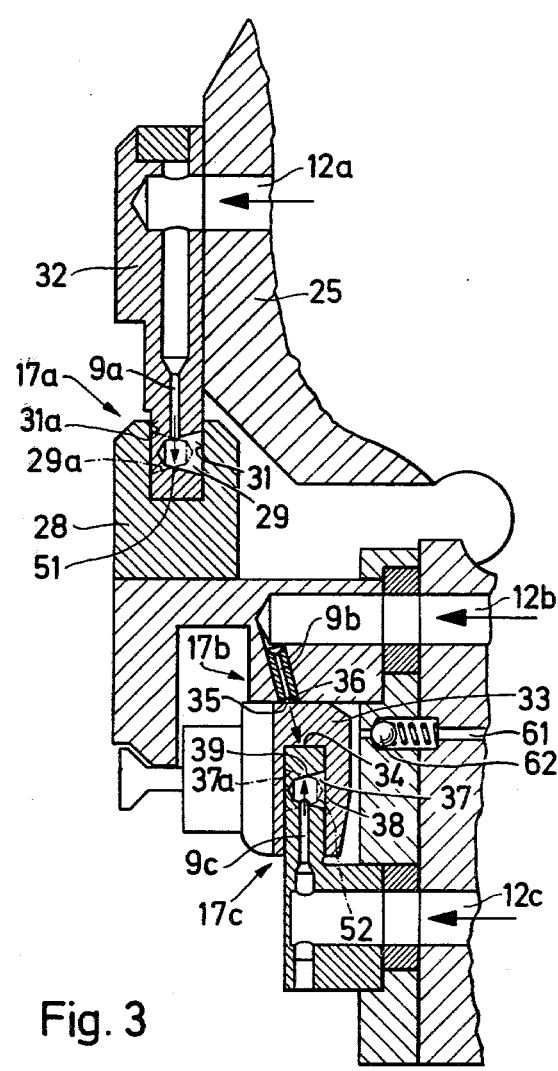
FIG. 3 illustrates a detailed view of a lubricating station utilizing a system of the invention.

Referring to FIg. 3, in order to lubricate three lubricating stations 17a, 17b, 17c in a picking casing 25 of a weaving machine, a feed line 12a, 12b, 12 c and a nozzle 9a, 9b, 9c is connected to each station 17a, 17b, 17c. As shown, at station 17a, an oil mist pulse and an air pulse are introduced through a spray chamber 29, 29a as a slide block 28 of a yarn pay-off device and recuperator (not shown) reciprocates perpendicularly to the drawing. Some of the oil mist impinges on an oppositely disposed surface 51 of the spray chambers and the relatively large oil particles collect on the surface 51. Together with the oil mist component which contains the relatively small oil particles and which has been deflected in the spray chamber, the relatively large oil particles reach the surfaces 31, 31a to be lubricated between the member 29 and a stationary guide bar 32.

At the station 17b wherein a projectile striker 33 reciprocates perpendicularly to the plane of the drawing, an oil mist pulse and an air pulse reach a lubricating station 35 or 34 alternately depending upon the opening or closing of a nozzle orifice 36 by the striker 33. At the lubricating station 17c which is provided for the striker 33, the oil mist pulse passing through the nozzle 9c and the air pulse pass through a spray chamber 37. This spray chamber is disposed in the plane of the drawing and has an impingement surface 39. The oil mist pulse and air pulse pass through a spray chamber 37 located behind the plane of the drawing to reach to lubricating surfaces 38, 41.

A passage 61 and an associated ball valve 62 can be provided via which the oil mist can be extracted by extraction pulses in an appropriate program sequence. These extraction pulses, may occur, for example during the oil mist pulses or during the air pulses or during the overall pulses embodied by the oil mist and air pulses.

Figure 4:
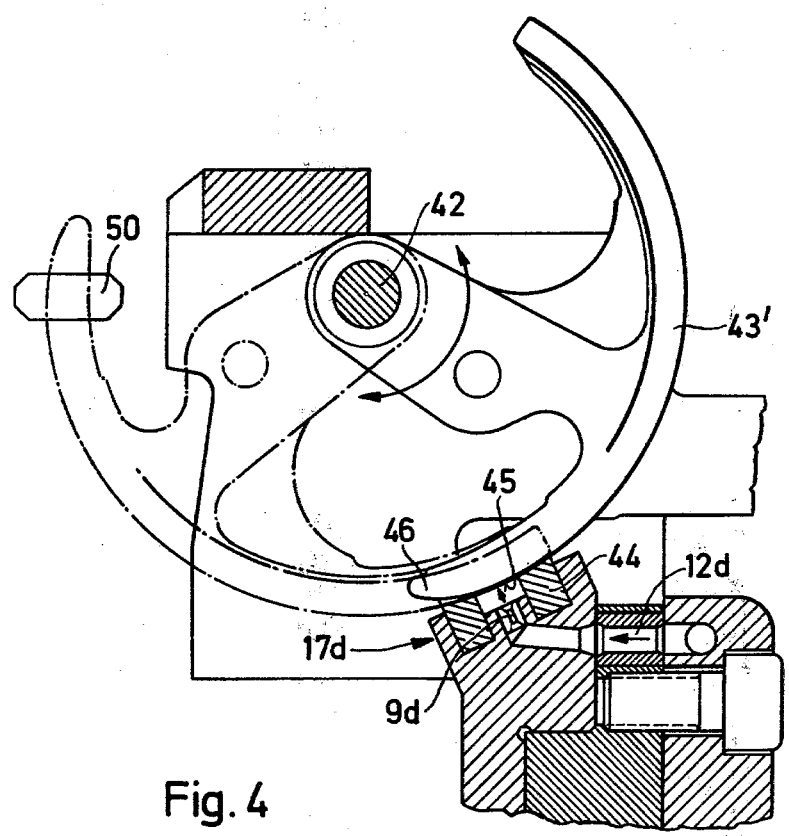
FIG. 4 illustrates a further lubricating station of a weaving machine utilizing the invention.

Referring to FIG. 4, the weaving machine may also have another lubrication station 17d associated with a wheel 43′ which is adapted to reciprocate about a pivot 42 and run on an element 44 made of foamed material. In this case, the oil mist pulse and the scavenging air pulse are supplied through a feed line 12d to pass through a nozzle 9d to reach a surface 45 which is to be lubricated and which is the outer orifice surface of the wheel 43′. The wheel 43′ thus has the whole outside surface lubricated during reciprocation so that the tip 46 of the wheel 43′ is lubricated upon entering a slot in a picking projectile 50 to open a yarn clamp thereof. Thereafter, the projectile 50 can engage a weft yarn to be picked in known fashion.

Figure 2:
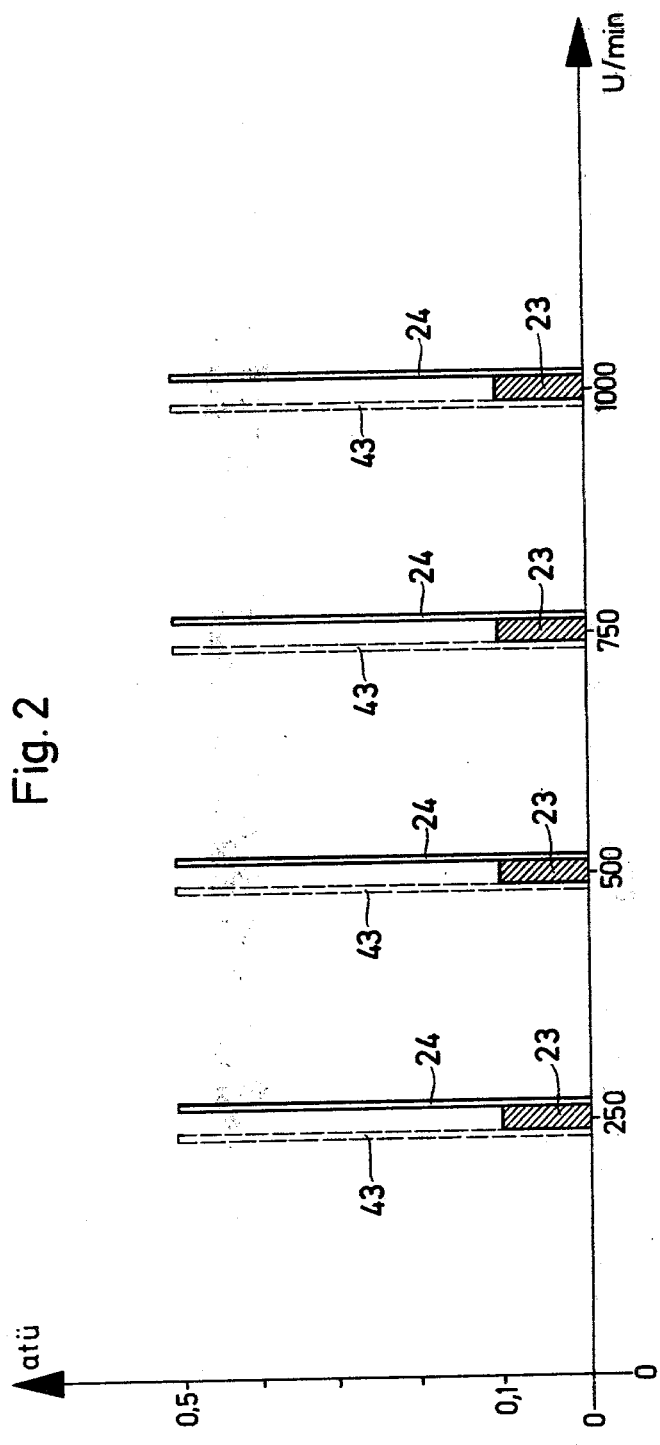
FIG. 2 illustrates a corresponding pressure diagram for the discrete lubricating stations on the system of FIG. 1.

As a variant, the mode of lubricant may be modified such that a scavenging air pulse 43 as shown in dotted line in FIG. 2 is given instead of or in addition to the air pulse 24 before the air mist pulse 23.

Likewise, as a variant of a lubricating system, instead of using a compressor 1 in the picking mechanism to provide an independent supply of compressed air, use may be made of a compressor 1′ (FIG. 1) which is associated with a number of weaving machines and which can be connected via a line 12f to the feed line 12 or the system can be supplied through a line 12g through a common mains air system 1″.

The extraction pulses may also operate through the same nozzle 9a, b, c as the oil mist and air pulses (FIG. 3).

The invention thus provides a system of lubricating the various lubricating stations of a textile machine in a relatively simple manner with a relatively low consumption of oil.

What is claimed is:

1. A method of lubricating a textile machine comprising the step of delivering a programmed sequence of lubricant-mist pulses and gas pulses to at least one lubricating station of the machine.

2. A method as set forth in claim 1 wherein said lubricant-mist pulses are at a lower pressure than said gas pulses.

3. A method as set forth in claim 1 wherein a lubricant-mist pulse is of a duration four times as long as an immediately preceding or following gas pulse.

4. A method as set forth in claim 1 wherein said lubricant-mist pulses and said gas pulses are delivered with a time delay therebetween.

5. A method as set forth in claim 1 wherein consecutive sequences of said pulses are delivered with a time delay therebetween.

6. A method as set forth in claim 1 wherein said lubricant-mist pulses and said gas pulses are delivered through a common nozzle at the lubricating station.

7. A method as set forth in claim 1 or claim 6 wherein a lubricant-mist pulse is of longer duration than a gas pulse.

8. A method as set forth in claim 1 or claim 6 wherein a gas pulse is delivered immediately after delivery of a lubricant-mist pulse.

9. A method as set forth in claim 1 or claim 6 wherein a gas pulse is delivered immediately before delivery of a lubricant-mist pulse.

10. A method as set forth in claim 1 which further comprises the step of generating a programmed sequence of extraction pulses at the lubricating station to remove lubricant mist and dirt therefrom.

11. A method as set forth in claim 10 wherein an extraction pulse occurs substantially during a lubricant mist pulse.

12. A method as set forth in claim 10 wherein an extraction pulse occurs substantially during a gas pulse.

13. A method as set forth in claim 10 wherein an extraction pulse lasts substantially as long as a corresponding lubricant-mist pulse and gas pulse.

14. A method as set forth in any of claims 10 to 13 wherein said extraction pulses are conveyed through a common nozzle with said lubricant-mist pulses and said gas pulses.

15. A method as set forth in any of claims 10 to 13 wherein said extraction pulses are conveyed through a passage at the lubricating station.

16. A lubricating system for a textile machine having at least one lubricating station, said system comprising
first means for supplying a gas to said station;
second means for supplying lubricant-mist to said station; and
an electronic controller connected to each said means for selectively activating said first and second means to deliver a programmed sequence of gas pulses and lubricant-mist pulses to said lubricating station.

17. A lubricant system as set forth in claim 16 which further comprises an extractor line at said lubricating station for extracting lubricant mist therefrom.

18. A lubricating system as set forth in claim 16 wherein said first means includes a tank containing compressed air, a first line communicating said tank with said lubricating station to deliver compressed air thereto, and a valve in said line to control the flow of air therethrough, said controller being connected to said valve to selectively open and close said valve at periodic intervals.

19. A lubricating system as set forth in claim 18 wherein said second means includes a second line connected in parallel with said first line relative to the flow of air from said tank to said lubricating station, an oil mister connected to said second line to deliver oil mist thereto and a second valve in said second line upstream of said oil mister relative to the flow of air in said second line to control the flow of air through said second line, said controller being connected to said second valve to selectively open and close said second valve at periodic intervals and in programmed sequence to said first valve.

20. As set forth in claim 18 which further comprises a water separator downstream of said tank in the flow of air therefrom for removing water from the flow of air and a pressure controller downstream of said water separator to control the pressure of the flow of air.

21. A lubricating system for a textile machine having at least one lubrication station, said system comprising
a compressed air tank;
an air feed line communicating said tank with said lubricating station to deliver compressed air thereto;
a pair of parallel branch lines in said air feed line for conveying compressed air therethrough;
an oil mister connected to one of said branch lines to deliver oil mist thereto;
a first valve in said one branch line upstream of said oil mister to control the flow of air therethrough;
a second valve in the other of said branch lines to control the flow of air therethrough; and
means connected to each of said valves for selectively opening and closing said valves in a programmed sequence to deliver a programmed sequence of air pulses and lubricant-mist pulses to said lubricating station.

22. As set forth in claim 21 which further comprises an extractor line at said lubricating station for extracting lubricant mist therefrom.

* * * * *

UNITED STATES PATENT AND TRADEMARK OFFICE
CERTIFICATE OF CORRECTION

PATENT NO. :   4,205,708
DATED      :   June 3, 1980
INVENTOR(S) :  Herbert Burgbacher It is certified that error appears in the above—identified patent and that said Letters Patent is hereby corrected as shown below:

Column 4, line 3, change "FIg." to --FIG.--.

Column 4, line 52, change "lubricant" to --lubrication--.

Column 4, line 65, change "nozzle" to --nozzles--.

Signed and Sealed this

Twenty-fifth Day of November 1980

[SEAL]

Attest:

SIDNEY A. DIAMOND

Attesting Officer

Commissioner of Patents and Trademarks